United States Patent
Atkin et al.

(10) Patent No.: US 7,975,256 B2
(45) Date of Patent: *Jul. 5, 2011

(54) OPTIMIZING APPLICATION PERFORMANCE THROUGH DATA MINING

(75) Inventors: Steven Edward Atkin, Austin, TX (US); Margot Bruce Casey, Austin, TX (US); Tyron Jerrod Stading, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1343 days.

This patent is subject to a terminal disclaimer.

(21) Appl. No.: 10/881,968

(22) Filed: Jun. 30, 2004

(65) Prior Publication Data

US 2006/0005177 A1 Jan. 5, 2006

(51) Int. Cl.
*G06F 9/44* (2006.01)
*G06F 9/45* (2006.01)

(52) U.S. Cl. .......... 717/122; 717/123; 717/154

(58) Field of Classification Search .......... 717/120–123, 717/146, 151, 154, 159
See application file for complete search history.

(56) References Cited

U.S. PATENT DOCUMENTS

| | | | | |
|---|---|---|---|---|
| 5,237,688 A * | 8/1993 | Calvert et al. | ................. | 717/121 |
| 5,317,741 A * | 5/1994 | Schwanke | ..................... | 717/120 |
| 5,553,290 A * | 9/1996 | Calvert et al. | ................. | 717/121 |
| 5,590,270 A * | 12/1996 | Tsukuda et al. | ............... | 717/121 |
| 5,649,200 A * | 7/1997 | Leblang et al. | ............... | 717/122 |
| 5,740,440 A * | 4/1998 | West | ........................... | 717/125 |
| 5,860,004 A * | 1/1999 | Fowlow et al. | ............... | 717/109 |
| 5,860,007 A * | 1/1999 | Soni et al. | ..................... | 717/121 |
| 6,083,277 A * | 7/2000 | Fowlow et al. | ............... | 717/107 |
| 6,128,608 A * | 10/2000 | Barnhill | ........................ | 706/16 |
| 6,195,796 B1 * | 2/2001 | Porter | ............................ | 717/122 |
| 6,279,030 B1 * | 8/2001 | Britton et al. | ................. | 709/203 |
| 6,298,353 B1 | 10/2001 | Apte | | |
| 6,324,619 B1 * | 11/2001 | Raverdy et al. | ............... | 717/120 |
| 6,536,037 B1 * | 3/2003 | Guheen et al. | ................. | 717/151 |
| 6,677,964 B1 * | 1/2004 | Nason et al. | .................. | 715/764 |
| 6,718,546 B1 * | 4/2004 | Johnson | ........................ | 717/169 |
| 6,785,882 B1 * | 8/2004 | Goiffon et al. | ................. | 717/120 |
| 6,871,345 B1 * | 3/2005 | Crow et al. | .................... | 717/175 |
| 6,915,506 B2 * | 7/2005 | Dhong et al. | ................. | 717/101 |
| 7,076,778 B2 * | 7/2006 | Brodersen et al. | ............. | 717/170 |
| 2002/0100017 A1 * | 7/2002 | Grier et al. | ..................... | 717/120 |
| 2002/0143590 A1 * | 10/2002 | Dhong et al. | ....................... | 705/7 |
| 2003/0037328 A1 * | 2/2003 | Cicciarelli et al. | ............ | 717/178 |
| 2003/0159130 A1 * | 8/2003 | Broussard et al. | ............ | 717/120 |
| 2004/0073899 A1 | 4/2004 | Luk et al. | | |

(Continued)

OTHER PUBLICATIONS

Dahm et al. "Byte Code Engineering with the JavaClass API", 1999, Freie Universitat Berlin, Institut fur Informatik. (available at citeseer.ist.psu.edu/dahm99byte.html).*

(Continued)

*Primary Examiner* — Jason D Mitchell
(74) *Attorney, Agent, or Firm* — Dillon & Yudell LLP

(57) ABSTRACT

Metadata describing common Java classes is extracted and utilized to optimize a Java program's performance based on the code requirements of the application. Data mining techniques extract metadata and other information about different sets of JVM byte code written by multiple vendors to determine the design choices and optimizations made by each vendor in implementing their JVM. Then, byte code in a Java application being programmed is analyzed in comparison to each vendor's JVM metadata and information. Based upon the application's requirements (for example footprint, performance, etc.), recommendations are generated that yield a newly compiled rt.jar that combines the best practices of each vendor together or recommends a particular vendor's standard JVM that is best suited for the application.

15 Claims, 13 Drawing Sheets

U.S. PATENT DOCUMENTS

| | | | |
|---|---|---|---|
| 2004/0117784 A1* | 6/2004 | Endoh | 717/169 |
| 2004/0230941 A1* | 11/2004 | Marin et al. | 717/100 |
| 2005/0204338 A1* | 9/2005 | Davis et al. | 717/115 |
| 2006/0004810 A1* | 1/2006 | Atkin et al. | 707/101 |
| 2006/0005161 A1* | 1/2006 | Atkin et al. | 717/106 |
| 2006/0005166 A1* | 1/2006 | Atkin et al. | 717/120 |
| 2006/0005167 A1* | 1/2006 | Wade | 717/121 |
| 2006/0161895 A1* | 7/2006 | Speeter et al. | 717/121 |
| 2006/0248171 A1* | 11/2006 | Herla et al. | 709/220 |
| 2007/0094641 A1* | 4/2007 | Darr et al. | 717/121 |

OTHER PUBLICATIONS

"BCEL—Byte Code Engineering Library (BCEL)", copyright 1999-2001, Apache Software Foundation.*

Snyder "Encapsulation and Inheritance in Object-Oriented Programming Languages", 1986, OOPSLA '86 Proceedings, pp. 38-45.*

IEEE "The Authoritative Dictionary of IEEE Standards Terms" 7th ed., 2000, p. 268.*

* cited by examiner

| Vendor | Class | Method | # Lines | # Native Calls | # Try/ Catch blocks | Referred Classes | ... |
|---|---|---|---|---|---|---|---|
| Vendor1 | ClassLoader | findClass | 54 | 3 | 1 | 4 | |
| Vendor2 | ClassLoader | findClass | 135 | 2 | 5 | 5 | |
| Vendor3 | ClassLoader | findClass | 89 | 2 | 3 | 2 | |

OPTIMIZING APPLICATION PERFORMANCE THROUGH DATA MINING

CROSS-REFERENCE TO RELATED APPLICATIONS

The present application is related to the following co-pending U.S. patent applications filed on even date herewith, and incorporated herein by reference in their entirety:

Ser. No. 10/881,967, entitled "Method, System And Program Product For Determining Standard Java Objects"

Serial Number 10/881,973, entitled "Method, System And Program Product For Determining Java Software Code Plagiarism And Infringement"

Serial Number 10/881,969, entitled "Method, System And Program Product For Evaluating Java Software Best Practices Across Multiple Vendors"

BACKGROUND

1. Field of the Invention

The present invention relates to computer systems, software architectures and programs, and more particularly to a method, system and computer program product for optimizing performance of Java programs.

2. Description of the Related Art

Java is a robust, portable object-oriented programming language developed by Sun Microsystems, Inc., that is gaining wide acceptance for writing code for the Internet and World Wide Web (hereinafter, "Web"). Java attains its portability through use of a specially-designed virtual machine ("VM"). The terms "Java" and "JVM" are trademarks of Sun Microsystems, Inc. This virtual machine is also referred to as a "Java Virtual Machine", or "JVM". The virtual machine isolates the details of the underlying hardware from the compiler used to compile the Java programming instructions. The compiled code, referred to as Java "byte code", then runs on top of a JVM, where the JVM is tailored to a specific operating environment.

The nature of Java programming allows designers to approach software solutions in many different ways. Based upon specifications and goals, each software vendor for a particular application will implement their solution slightly differently. While Java profiling of various class implementations has been looked at extensively to assist programmers in developing their applications, such profiling typically involves the runtime performance of the program in its execution code framework. The profiling results in the program being reconfigured for optimization within the context of an execution code framework. What has not been heretofore considered is optimization of execution code in the context of its application. For example, among the various JVM vendors, each emphasize their solution's particular advantages such as faster performance or higher security. However, it is very difficult for Java programmers to learn where each vendor has chosen to optimize their particular implementation of a Java solution. It would be valuable for a software engineer or application writer to understand the strengths and weaknesses of each particular implementation of a Java program so that the solution with the best practices can be integrated or utilized in the application the programmer is designing, rather than being restricted to optimizing the program within a rigid framework. As can be seen, it would be desirable to provide pre-runtime analysis of Java class implementations that takes advantage of the Java language to present the design choices that would be of most value to a programmer, thereby allowing the best practices of Java class implementations to be incorporated or utilized in the custom design.

SUMMARY OF THE INVENTION

In accordance with the present invention, improved methods, systems and articles of manufacture for optimizing a software program are disclosed. In one embodiment of the present invention, an analysis tool extracts class data from a plurality of objects originating from one or more software vendors and from the software program. Class data of the various vendor implementations are compared across various performance metrics, which are output for the program designer as a function of vendor, and objects having class data matching the class data from the software program are determined. The designer then selects among the determined one or more objects having desired design specifications for incorporation into the software program when implementing the new software program.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

In a preferred embodiment, metadata describing common Java classes is extracted and utilized to optimize a Java program's performance based on the code requirements of the application. Specifically, a preferred embodiment uses data mining techniques to extract metadata and other information about different sets of JVM byte code written by multiple vendors to determine the design choices and optimizations made by each vendor in implementing their JVM. Then, byte code of a Java application being programmed is analyzed in comparison to each vendor's JVM metadata and information. Based upon the application's requirements (for example footprint, performance, etc.), recommendations are generated that yield a newly compiled rt.jar that combines the best practices of each vendor together or recommends a particular vendor's standard JVM that is best suited for the application. The function of a tool for performing this modeling and analysis in a typical software environment is described below.

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a Java software system, it will be appreciated that the present invention is not limited to Java implementations.

Figure 1:
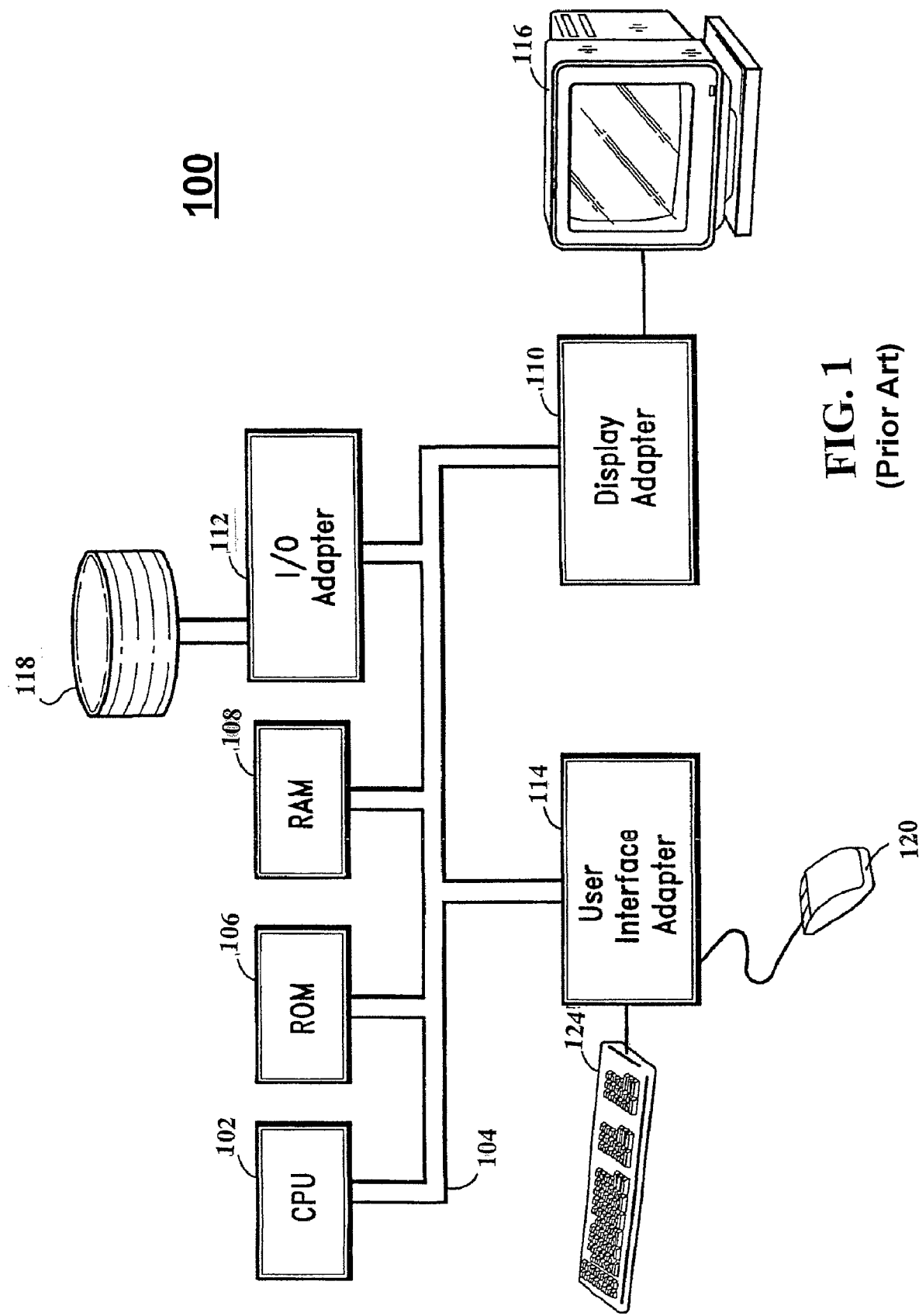
FIG. 1 is a block diagram of a general-purpose computer system to which the present invention may be applied.

FIG. 1 is a block diagram of a general-purpose computer system 100 to which the present invention may be applied. The computer system 100 includes at least one processor (CPU) 102 operatively coupled to other components via a system bus 104. A read only memory (ROM) 106, a random access memory (RAM) 108, a display adapter 110, an I/O adapter 112, and a user interface adapter 114 are coupled to system bus 104.

Display adapter 110 operatively couples a display device 116 to system bus 104. A disk storage device (e.g., a magnetic or optical disk storage device) 118 is operatively coupled to system bus 104 by I/O adapter 112. User interface adapter 114 operatively couples a mouse 120 and keyboard 124 to system bus 104. One or more objects are created when an Object-Oriented Program (not shown) is executed in computer system 100.

The present invention has particular utility in Java applications. Java is a robust, portable object-oriented programming language developed by Sun Microsystems, Inc. Java attains its portability through use of a virtual machine or "Java Virtual Machine", or "JVM". The JVM enables isolating the details of the underlying hardware from the compiler used to compile the Java programming instructions.

Java applications are typically constructed using a development toolkit such as the "JDK" (Java Development Kit) product from Sun Microsystems, and are executed using the "JRE" (Java Runtime Environment) product, also from Sun Microsystems. Programs are executed from the command line when using the JRE. The Java Runtime Environment includes the JVM, as well as a number of files and classes that are required to run Java applications or applets. Hereinafter, the terms "JVM" and "runtime environment" will be used interchangeably unless otherwise noted.

Java program source code typically consists of a set of class definitions stored in a series of text files. A Java class contains both methods and data. Java source code is compiled into binary code, referred to as Java "byte code." Byte codes are machine independent so that they can be executed on any machine's JVM, where the JVM is tailored to the specific operating environment. After the source code files are compiled into Java byte code class files, they are then typically loaded into memory by a class loader for interpretation by a JVM interpreter before the associated program is executed. Class loading can also occur when a Java program dynamically attempts to load another class at run time. The Java class loader uses a predetermined search strategy when locating class files, which gives precedence to particular locations. According to the Java 1.2 platform specification, the highest priority search locations are the bootstrap run time and internationalization classes in the JRE, named "rt.jar" and "118N.jar," respectively. The Java Archive (JAR) or ".jar" file is a repository that contains one or more Java class files and is simply called a "Java jar" or "JAR". JAR files provide compression, backward compatibility with existing Java applets, portability, and security features.

Figure 2A:
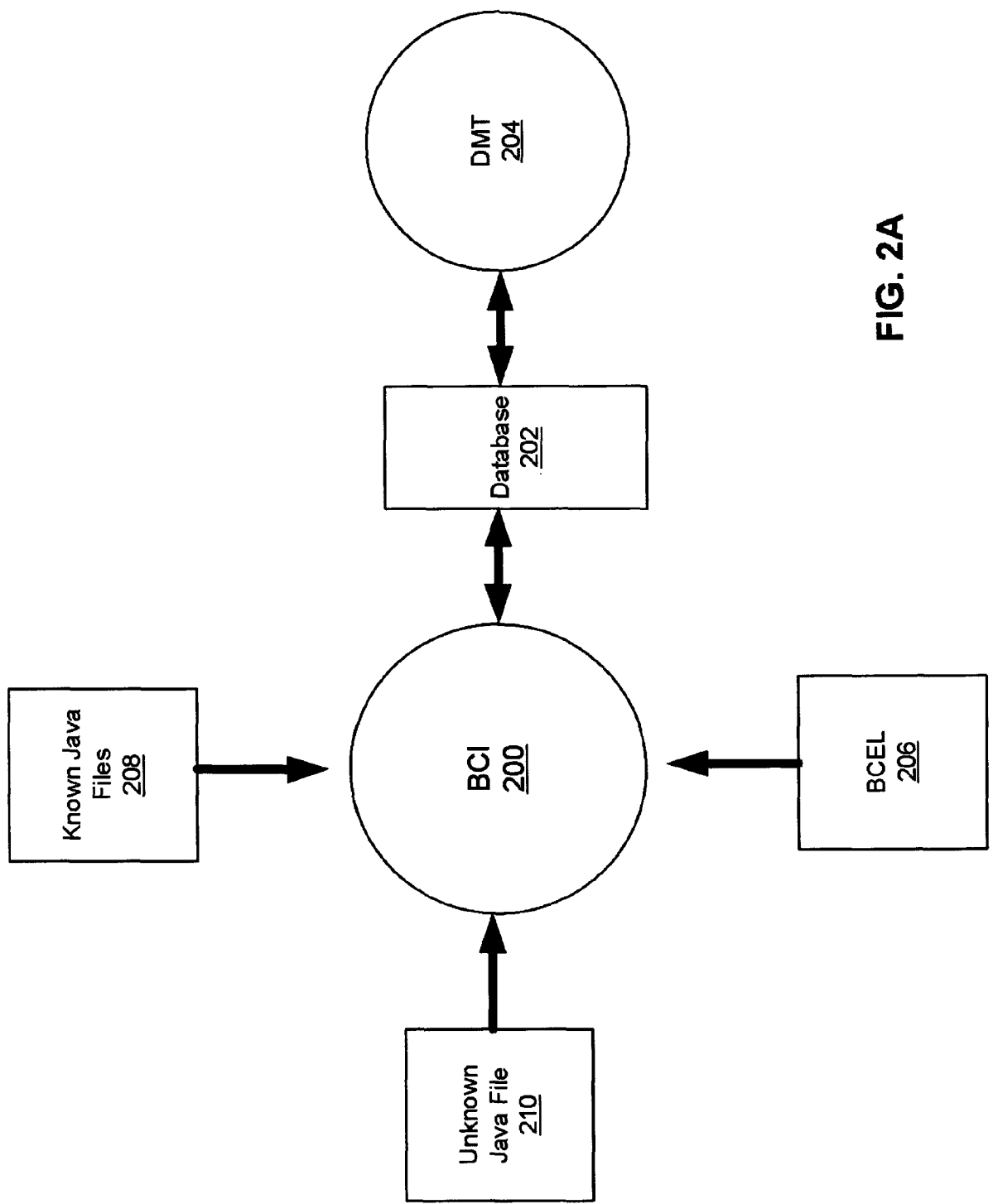
FIG. 2A a block diagram of a software architecture for system, in accordance with the preferred embodiment of the present invention.

With reference now to FIG. 2A, there is shown a block diagram of a software architecture for computer system 100, in accordance with the preferred embodiment of the present invention. In a preferred embodiment, an analysis tool written in Java, called the Byte Code Inspector (BCI) 200, is executing in CPU 102. BCI 200 accesses database 202, which is contained within disk storage device 118, for the storage and retrieval of analysis data. Database Mining Tool (DMT) 204 is also executing in CPU 102. In a preferred embodiment, a commercially available database mining tool such as Enterprise Miner produced by SAS, Inc. may implement DMT 204.

Figure 2B:
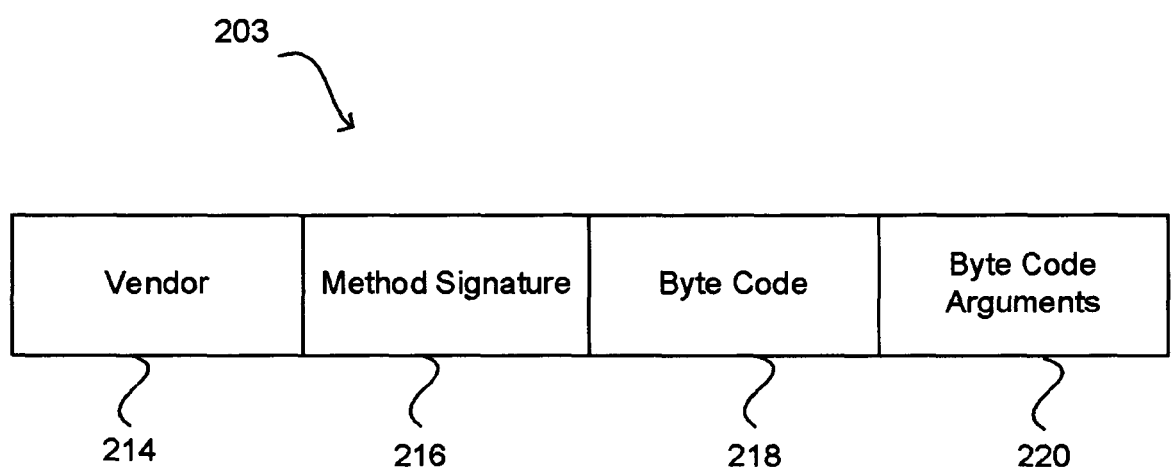
FIG. 2B is a logical block diagram of a Java file method entry in a database, in accordance with the preferred embodiment of the present invention.

BCI 200 decompiles a known Java class or JAR file (known Java files 208) to extract specific method information to be placed in database 202. FIG. 2B is a logical block diagram of a Java file method entry 203 in database 202. In a preferred embodiment, method entry 203 stores method information for a specific class of a Java file, including the vendor 214, method signature 216, byte code 218 and byte arguments 220. A number of method entries 203 are created in database 202 corresponding to each Java class contained in known Java files 208.

Figure 2C:
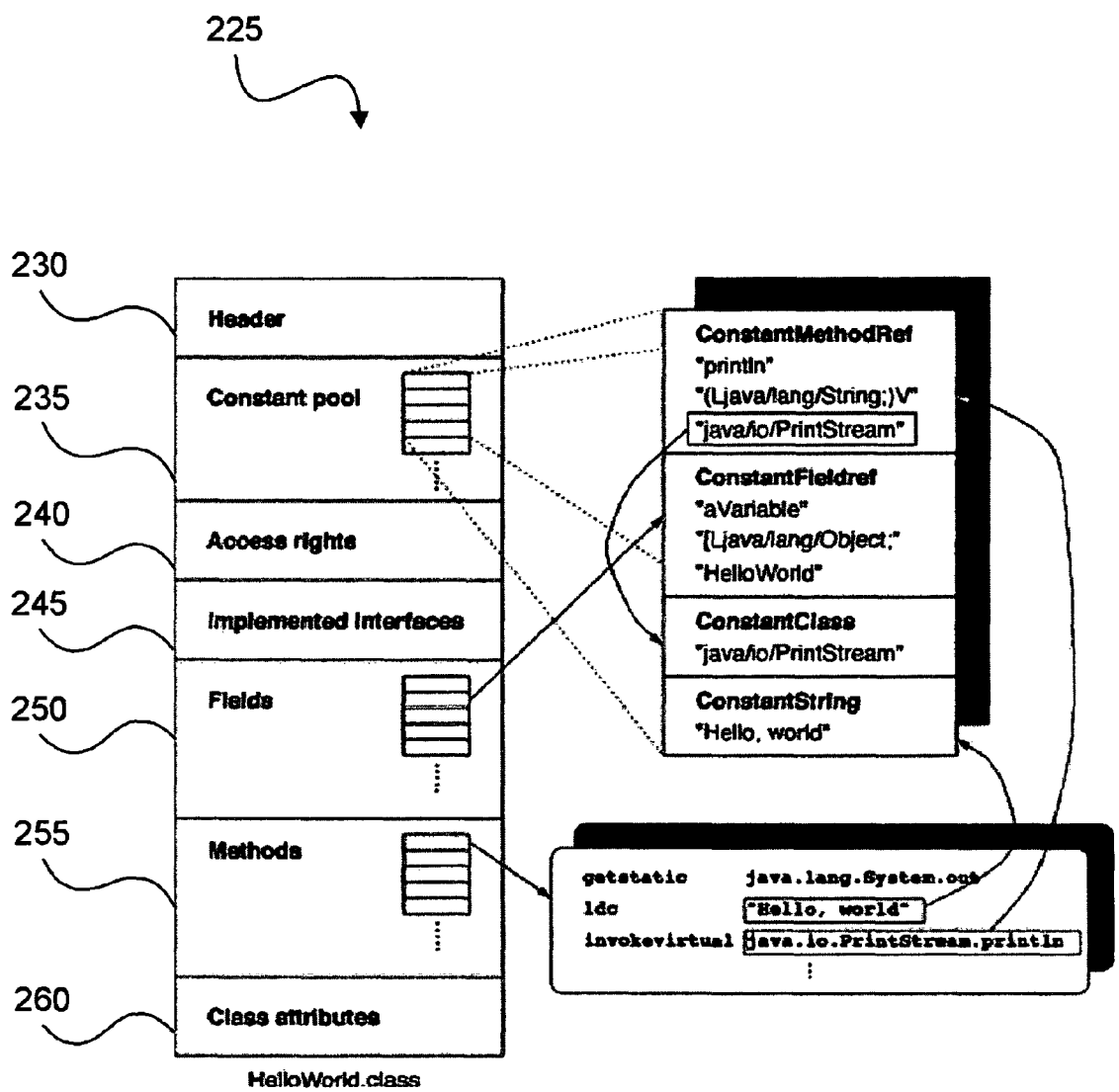
FIG. 2C shows a graphical representation of a Java class file as viewed by the Byte Code Engineering Library.

BCI 200 retrieves methods of a class being analyzed from a commercially available toolkit called the byte code engineering library (BCEL) 206. In a preferred embodiment, BCI 200 has been implemented using a publicly available byte code engineering library such as the open source Byte Code Engineering Library, which is available from The Apache Software Foundation on the Internet at http://jakarta.apache.org/index.html. This library is used to separate a Java class file into its constituent parts. FIG. 2C shows a graphical representation of a Java class file as viewed by the BCEL 206. As can be seen in FIG. 2C, the library separates the byte code for class 225 into various attributes, including a header 230, constant pool 235, access rights 240, implemented interfaces 245, fields 250, methods 255 and class attributes 260.

Figure 3:
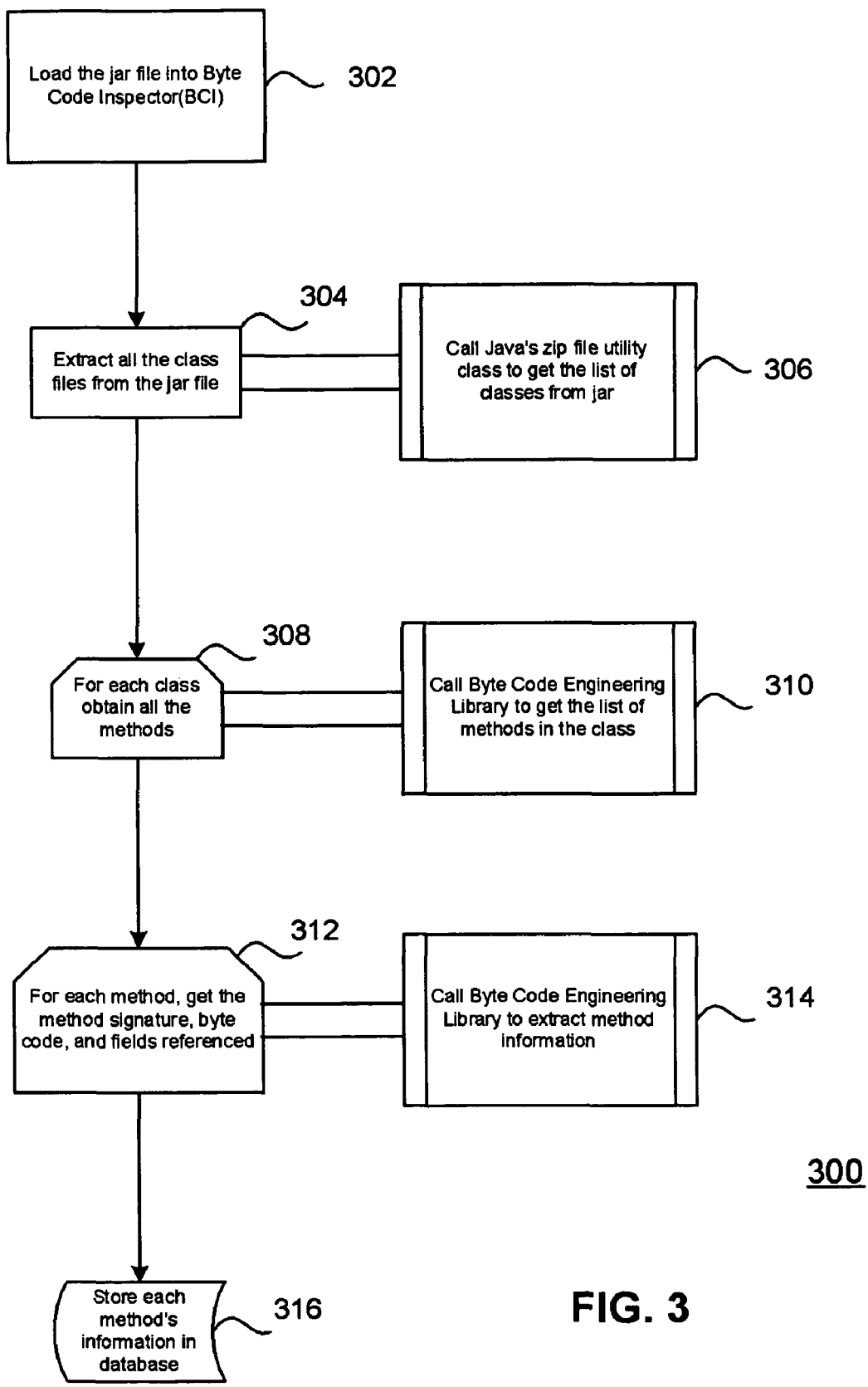
FIG. 3 is a flow diagram of a process for decompiling a Java archive that contains Java classes for use in the pre-analysis process, in accordance with the preferred embodiment of the present invention.

With reference now to FIG. 3, there is shown a flow diagram of a process implemented by BCI 200 for unpacking a Java archive for use in the pre-analysis process 500 (see FIG. 5), in accordance with the preferred embodiment of the present invention. As shown in FIG. 3, process 300 begins at step 302, when the user loads the known Java files 208 into BCI 200. At step 304, BCI 200 extracts all class files contained in the known Java files 208 by calling Java's zip file utility class (shown at 306) to obtain the list of classes from the known Java files 208. At step 308, BCI 200 obtains all methods for each class extracted from the known Java files 208 (at step 304) by calling the BCEL 206 to get the corresponding list of methods known to be contained within each class (shown at 310). At step 312, BCI 200 extracts the method signature, byte codes, byte arguments and other fields for each method (shown at 314) by calling the BCEL 206. Thereafter, process 300 ends at step 316, when BCI 200 stores the method information 214-220 for each method of each class extracted at step 312 in database 202 within method entry 203.

Figure 4:
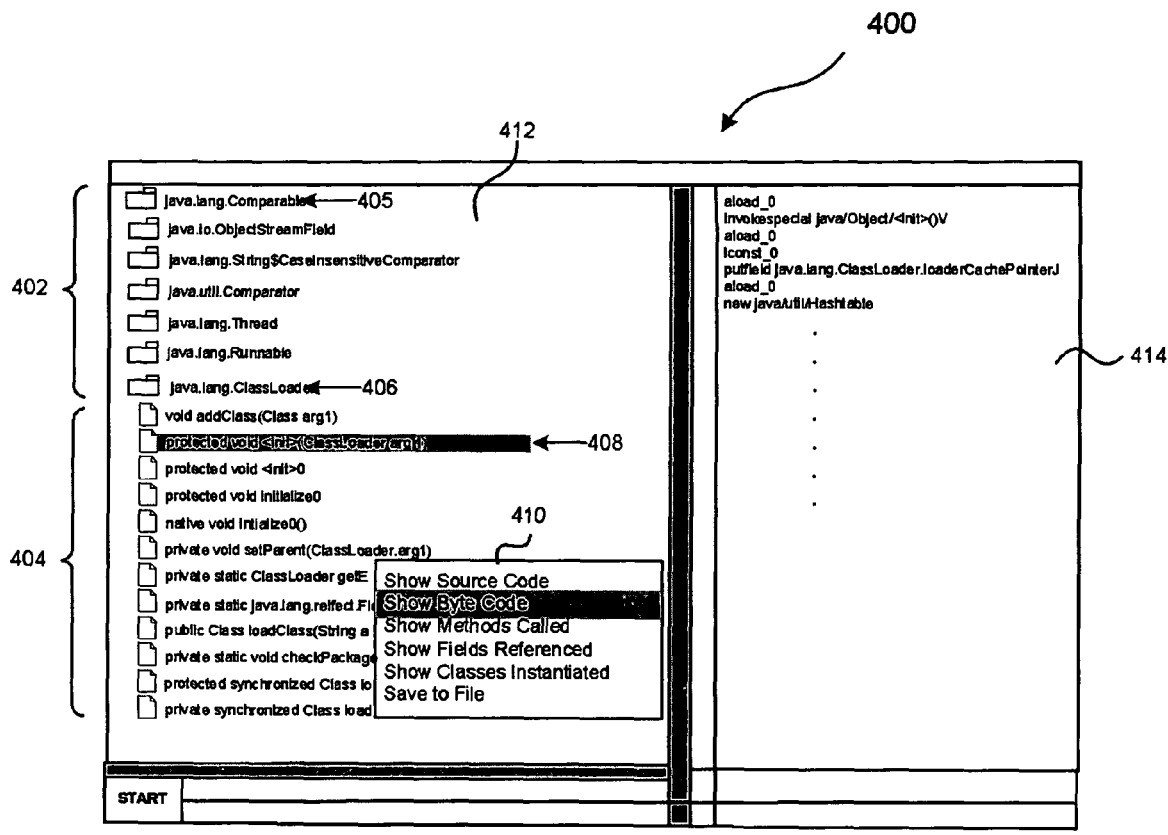
FIG. 4 shows a screen shot of the graphical user interface of the Byte Code Inspector tool, in accordance with the preferred embodiment of the present invention.

FIG. 4 shows a screen shot of the graphical user interface window (GUI) 400 of BCI 200. FIG. 4 shows an example where "rt.jar" has been decompiled by BCI 200 to extract all class files 402 within the rt.jar archive, and then to further extract all methods 404 within the class files 402. For example, the "java.lang.Comparable" 405 and "java.lang.ClassLoader" 406 class files 402 are shown within left windowpane 412. Additionally, the "java.lang.ClassLoader" class 406 is shown expanded in the GUI 400, thereby listing all of its methods 404 below the expanded class file 406. For example, the "protected void <init>(ClassLoader arg1)" method 408 is listed selected method in the left hand windowpane 412 of the GUI 400 are listed in the right hand windowpane 414. For example, as shown in FIG. 4, if the user selects "Show Byte Code" at a menu window 410 for the "protected void <init>(ClassLoader arg1)" method 408 (e.g., using a mouse) the constituent byte codes are shown in the right hand windowpane 414.

Figure 5:
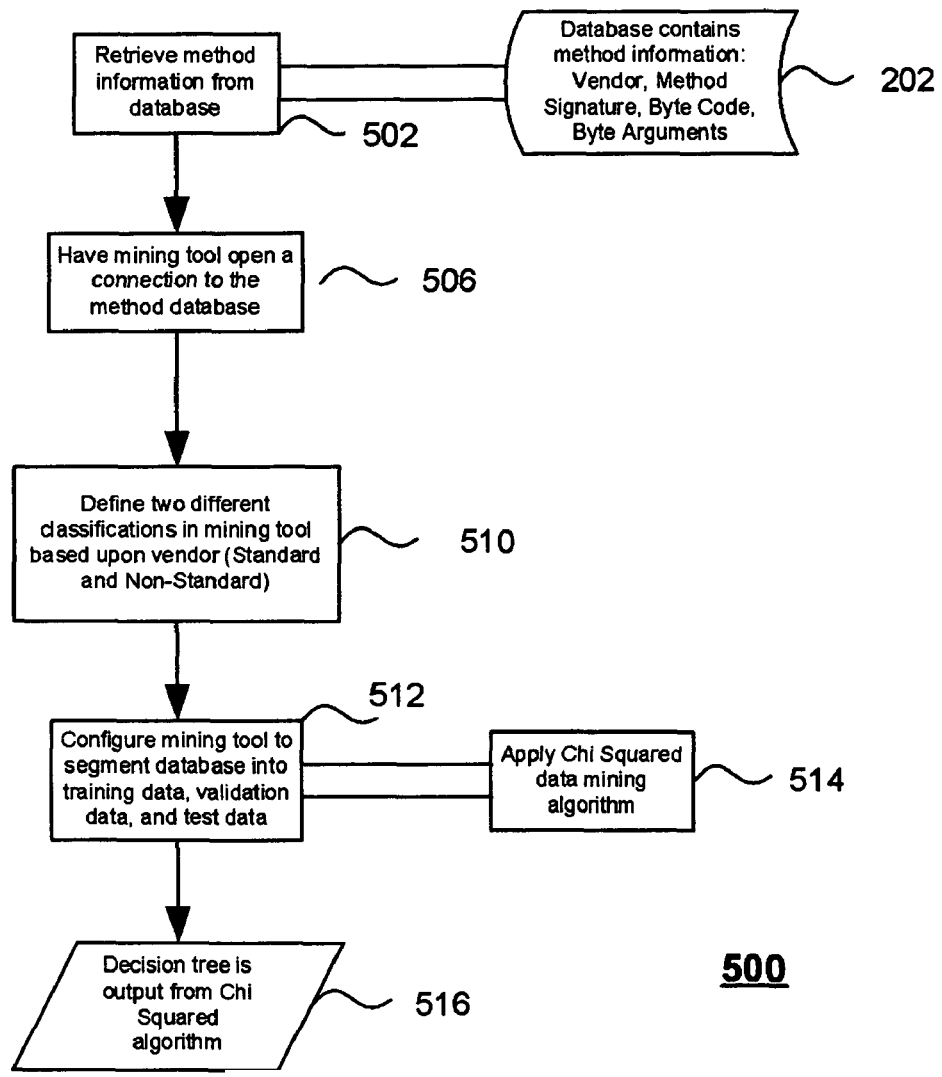
FIG. 5 shows a high-level flow diagram of the process of pre-analysis for the analysis tool, in accordance with the preferred embodiment of the present invention.

With reference now to FIG. 5, there is shown a high-level flow diagram of a process of pre-analysis, in accordance with the preferred embodiment of the present invention. Database Mining Tool (DMT) 204 performs a pre-analysis on a number of existing, known programs of the type being analyzed in order to learn what attributes are common among standard programs of this type. These attributes can then be tested in the unknown program to determine whether it is a standard or non-standard implementation. For example, if an analysis tool is being created to analyze a class loader of an unknown source, pre-analysis (as provided by process 500) is performed on a sampling of class loaders known to be standard and a sampling of class loaders known to be non-standard. As described in the preferred embodiment, pre-analysis of class loaders is performed by analyzing the rt.jar files from a number of well-known JVMs.

Process 500 begins at step 502, where BCI 200 retrieves the method information 214-220 of the program type being analyzed and stores the method information in database 202 (as described in process 300). The user accesses database 202 to retrieve attribute information stored in method entry(ies) 203 such as the vendor 214, method signature 216, byte code 218, and byte arguments 220 for the Java program type being analyzed. At step 506, DMT 204 opens a connection to the database 202. At step 510, the user defines two different classifications to be associated with the class being analyzed within DMT 204. In a preferred embodiment, these classifications are based upon whether the Java class is considered a "standard" or "non-standard" implementation of the class. This definition of either "standard" or "non-standard" is created and adapted as seen fit by the user of DMT 204. In the preferred embodiment, the determination of whether a given implementation is standard or non-standard is based on a user-defined classification of the vendor for the class. In other implementations, different fields or attributes within the database could be specified as the classification field for determining standard or non-standard implementations for the purpose of analysis.

In an alternative preferred embodiment, an additional field within the database 202 may be included that is labeled as "standard" or "non-standard" by the user or by a person who is familiar with that program type. This preferred embodiment relieves the designer or user from the decision process of defining what implementation of the class is standard or non-standard. In yet another preferred embodiment, a particular implementation of a Java class is designated "standard" or "nonstandard" based on programmatic testing of the known Java files 208 or database 202.

With reference back to step 512 in FIG. 5, DMT 204 selects a random sample of the class type from among the method entries 203 in database 202, and segments the sample into three sets of data: training data, validation data, and test data. The training data is used to create a decision tree. The validation data is used to measure the validity of the decision tree, and the test data is used to measure the final results of the decision tree. DMT 204 applies a decision tree algorithm 514 to the sample method entry 203 in a top-down, recursive fashion such that the resulting decision tree 600 (see FIG. 6) starts as a single node with all the training samples included in it. If all the samples are of the same classification (i.e., standard or non-standard), then the node is a leaf node and is labeled with that classification. Otherwise, DMT 204 calculates a "chi-squared" statistical measure for each attribute in the training data to determine the "goodness" of a split on that attribute. The attribute with the best chi-squared measure is designated as the "decision" attribute at the node. This process is recursively iterated at each node of the decision tree 600 until there are no more attributes to split on. In a preferred embodiment, a database 202 consisting of multiple Java rt.jar files extracted by BCI 200 is mined by creating a decision tree using the chi-squared measure of significance on the ClassLoader classes of the "Java.lang" package. The "Java.lang" package provides classes that are fundamental to the design of the Java programming language—the most important classes being "Object", which is the root of the class hierarchy, and "Class", instances of which represent classes at run time. Process 500 concludes at step 516, where a decision tree 600 (see FIG. 6) is output from DMT 204.

Figure 6:
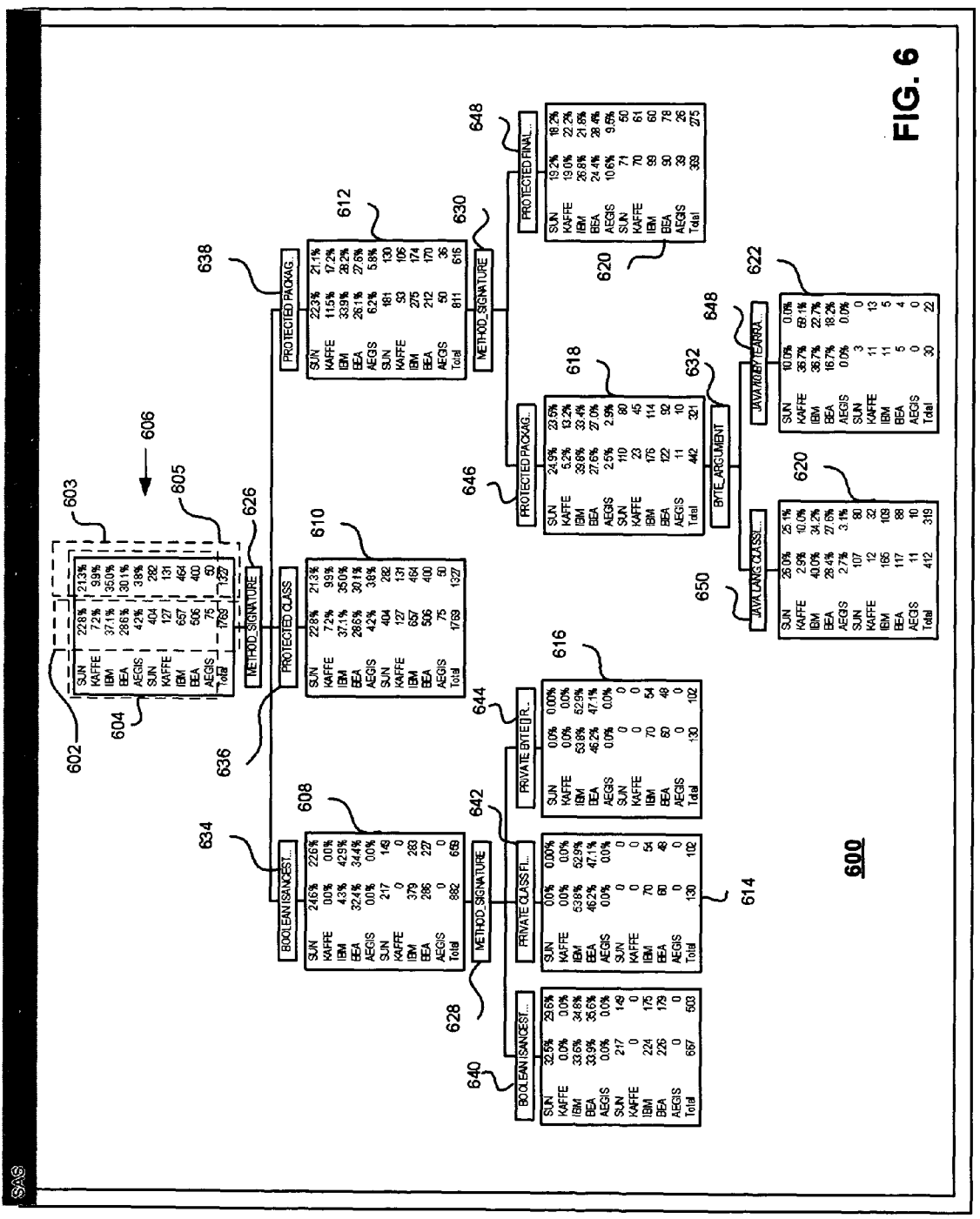
FIG. 6 shows a block diagram of the decision tree produced by the analysis tool, in accordance with the preferred embodiment of the present invention.

FIG. 6 shows a block diagram of the decision tree 600 produced by DMT 204, in accordance with the preferred embodiment of the present invention. Each node 606-622 within the decision tree 600 includes a listing of sampled vendors and indicates the amount of sampled data associated with that node. As seen within node 606, percentages and raw numbers are given for both the training data (column 602) and validation data (column 603) for each vendor's sampled data fitting into that category or node 606-622. For example, the root node 606 of decision tree 600 includes five entries (duplicated at reference numbers 604 and 605 for purposes of user analysis) for the sampled vendors. For the analysis shown in the example of FIG. 6, the vendors, IBM, BEA and SUN, are considered to have "standard" implementations of the "ClassLoader" class, and KAFFE and AEGIS are considered to have "non-standard" implementations of the "ClassLoader" class for purposes of training DMT 204 and producing testing data.

In decision tree 600, the fields or attributes within database 202 that are the "decision" attributes at the nodes 606-622 of the tree are designated at 626-632. For example, key 626 indicates that the first node 602 of decision tree 600 used the method signature field in the database 202 to make the decision or split, and key 632 indicates that the last node in decision tree 600 used the byte argument field in database 202. Within decision tree 600, headers 634-650 indicate the type of method signature, byte codes or byte arguments used for the decision attribute at its node of the decision tree 600, thereby indicating all possible branches from that node. As will be appreciated, any field within the information extracted from the database 202 may be designated as a "decision" attribute within the decision tree 600 if it best identifies a standard implementation of the target class. In a preferred embodiment, the byte code, method signatures and byte arguments are used as the method information to generate the decision tree 600.

Figure 7:
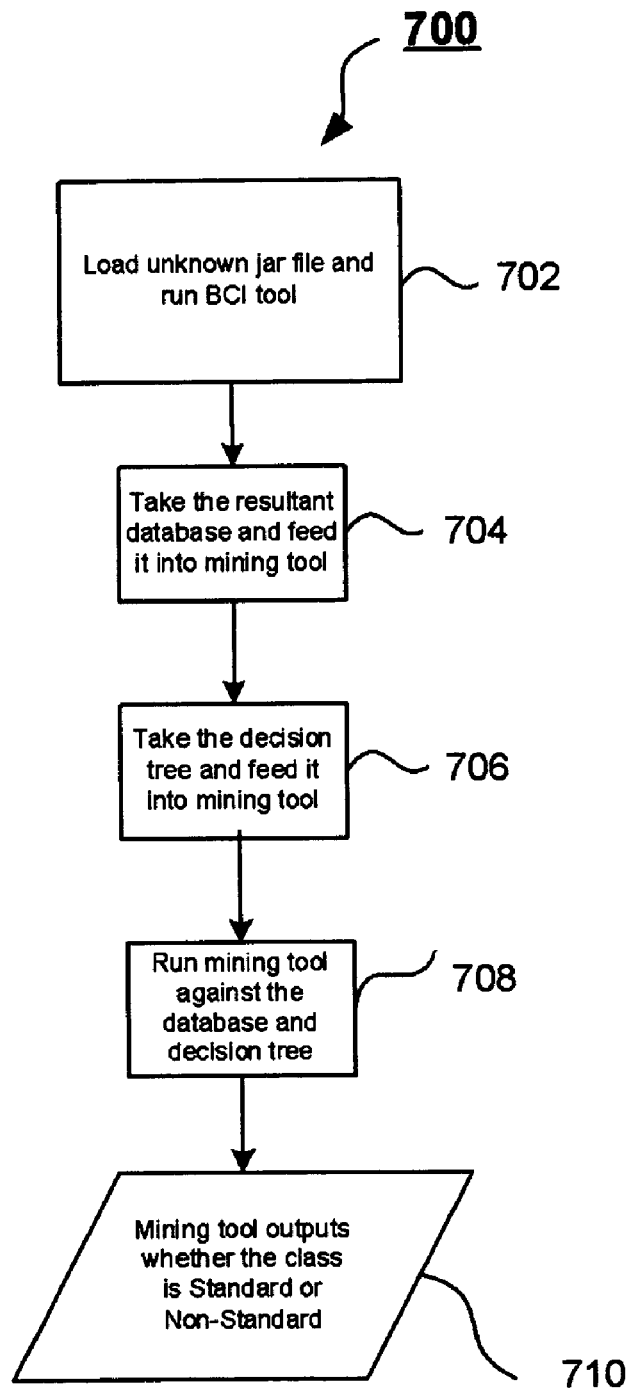
FIG. 7 shows a method for determining the classification of an unknown Java class as a standard or non-standard implementation of the selected class file, in accordance with the preferred embodiment of the present invention.

With reference now to FIG. 7, there is shown a method for determining the classification of an unknown Java archive as a standard or non-standard implementation of the selected class file, in accordance with the preferred embodiment of the present invention. Process 700 is performed by a user who has received an unknown JAR file (unknown Java file 210) and wants to determine if the received JAR file is "standard" or "non-standard" for its particular class. Process 700 begins at step 702, where the user loads the unknown Java file 210 into the user's computer system 100 and runs BCI 200 on the unknown Java file 210, which extracts the method information 212-220 from all applicable classes within the unknown Java file 210 and stores the information in a method entry 203 in association with unknown Java file 210 in database 202. In a preferred embodiment, the user uses BCI 200 to extract method signatures 216, byte code 218, and byte arguments 220 of a ClassLoader file in the unknown Java file 210 and stores them in database 202.

At step 704, DMT 204 reads the method entries 203 from database 202 for unknown Java file 210. At step 706, DMT 204 accesses a decision tree 600 developed in pre-analysis (process 500) for a set of known Java files 208 of the same type of class as the unknown Java file 210. For example, in the analysis of a ClassLoader, the decision tree 600 for ClassLoader is created from pre-analysis (process 500) of the standard and non-standard ClassLoaders. Thereafter, at step 708, DMT 204 uses the method information 214-220 extracted from the unknown Java file 210 and stored in database 202 as test data for the decision tree 600. This type of analysis comparison is well known to those skilled in the art and is a common feature on commercially available database mining tools (for example, SAS Enterprise Miner). DMT 204 then analyzes the "decision" attributes 626-648 previously used to build decision tree 600 with respect to the method information 214-220 extracted from the unknown Java file 210 to arrive at a statistical probability that the unknown Java file 210 falls within one of the leaf nodes 612-622 of decision tree 600. In pre-analysis (process 500) of the sampled database (known Java files 208), the user or programmer has designated each leaf node 612-622 as either "standard" or "non-standard" based on whether the user or programmer deems a particular leaf node as containing sufficient probabilities of standard implementations to be considered a "standard" path (step 512), thereby suggesting the conclusion that an unknown Java file 210 reaching that node in the analysis is within the class of "standard" or "non-standard" Java implementations, as applicable. Accordingly, at step 710, based on the programmer's pre-programmed designation of leaf nodes, and the resulting node at the end of the path within the decision tree 600 for unknown Java file 210, DMT 204 will output a determination that the extracted class of the unknown Java file 210 is considered either "standard" or "non-standard."

Figure 8A:
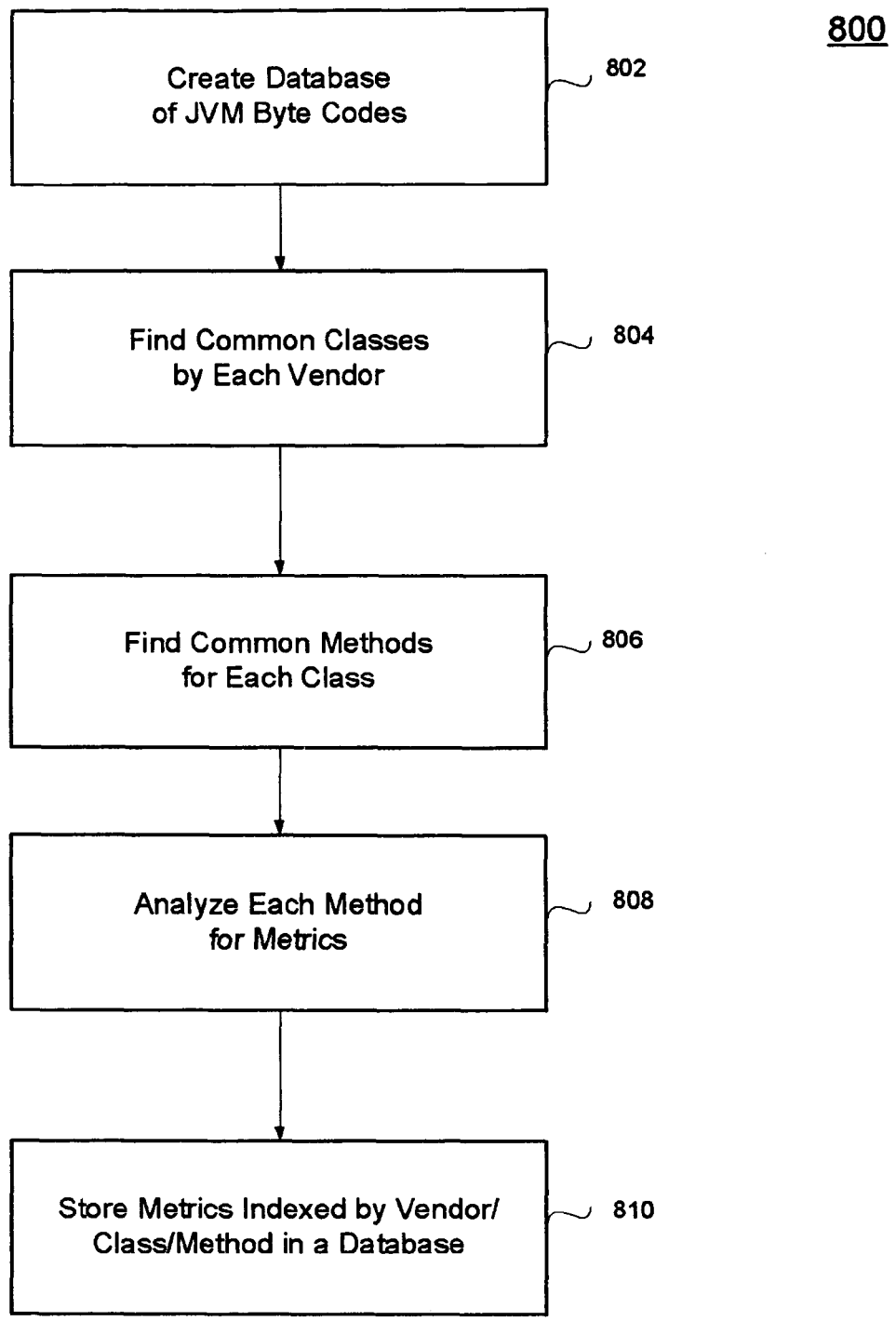
FIG. 8A shows a flow diagram for evaluating multiple vendors' implementations of a Java class, in accordance with a preferred embodiment of the present invention.

With reference now to FIG. 8A, there is shown a flow diagram for evaluating multiple vendors' implementations of a Java class, in accordance with a preferred embodiment of the present invention. In a preferred process, JVMs from different vendors are first evaluated. As seen in FIG. 8, process 800 begins at step 802, where a database (database 202) of JVM byte codes for each of the vendor implementations to be analyzed is created. In a preferred embodiment, a BCEL from an open source provider may be accessed to provide the byte code database. At step 804, BCI 200 extracts one or more classes that are common to each of the vendors' solutions from the JVM byte code database 202. In a preferred embodiment, a rt.jar for each vendor implementation (known Java files 208) is accessed. Then, at step 806, BCI 200 performs process 300 to find all the methods that are common for each of the vendor implementations within each of the classes identified at step 804. Here, using the BCEL created in step 802, BCI 200 breaks the byte codes of the found methods into multiple pieces, whereby method attributes are stored in association with each vendor in database 202.

Figures 8B, 9:
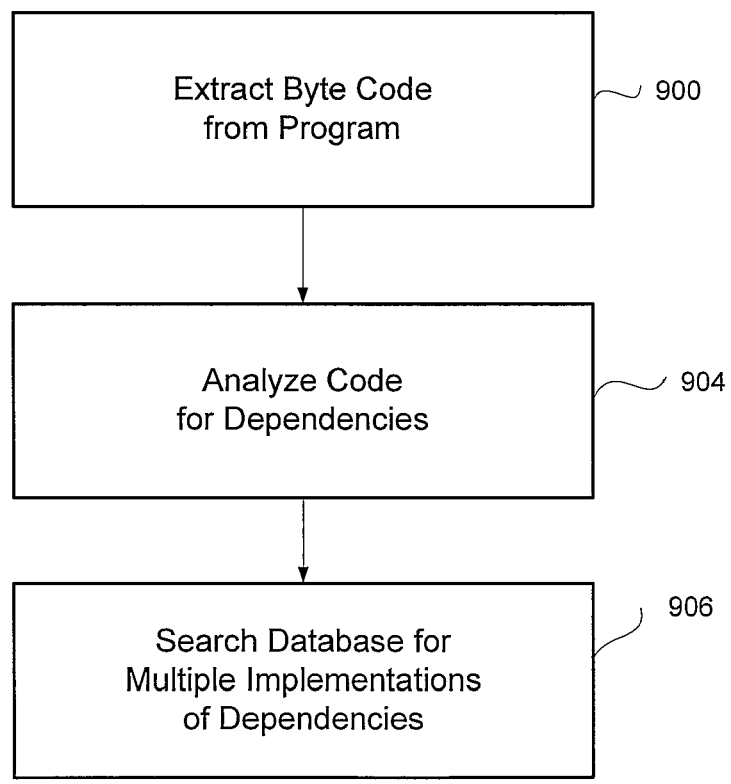
FIG. 8B shows an example of database entries indicating various design metrics associated with particular vendor implementations, in accordance with a preferred embodiment of the present invention.
FIG. 9 shows a process for evaluating a custom program's requirements, in accordance with the preferred embodiment of the present invention.

At step 808, BCI 200 analyzes each of the found methods for programming metrics of interest to the program designer, for example, such as size of the code, security implemented, performance provided, etc. BCI 200 programmatically uses data mining algorithms and statistical analysis (or the tool user manually operates data mining tools) to evaluate the method information collected per vendor to determine the association between the Java code and design features of the Java code advertised by the vendor. For example, class loading would be analyzed according to how many native calls are made and how many lines of byte codes are associated. In a preferred embodiment, process 800 is performed by applying the process 500 to each vendor's implementation and classifying in accordance with step 510 based on the program designer's identification of the vendor implementation as representing a particular design metric. At step 810, each of the analyzed classes, dependencies and metadata are stored in a database. In particular, the dependencies include libraries and other data from the JVM classes that the program being created is dependent upon. FIG. 8B shows an example of database entries indicating various design metrics associated with particular vendor implementations. In particular, FIG. 8B shows each vendor, class, method, number of lines of code, number of native calls, number of try/catch blocks, and number of referred classes for each of the analyzed Java classes.

With reference now to FIG. 9, there is shown a process for evaluating a custom program's requirements, in accordance with the preferred embodiment of the present invention. Process 900 begins at step 902, where the program designer extracts the byte code from the program being optimized. In a preferred embodiment, the programmer performs the extraction by compiling the Java source code being optimized into byte code using standard tools such as a JDK. At step 904, the programmer analyzes the extracted byte code for dependencies. For example, the programmer determines what common classes are loaded by the byte code (e.g., ClassLoader). The analyzed dependencies also include other data and objects that will be required by the various classes called during execution of the program. Thereafter, at step 906, the database (202) stored at step 810 is searched for multiple implementations of all dependencies determined at step 904. For example, if the ClassLoader is determined to be a common class accessed by the byte code during execution, the database 202 would be searched for each vendor's implementation of the ClassLoader object.

Figure 10:
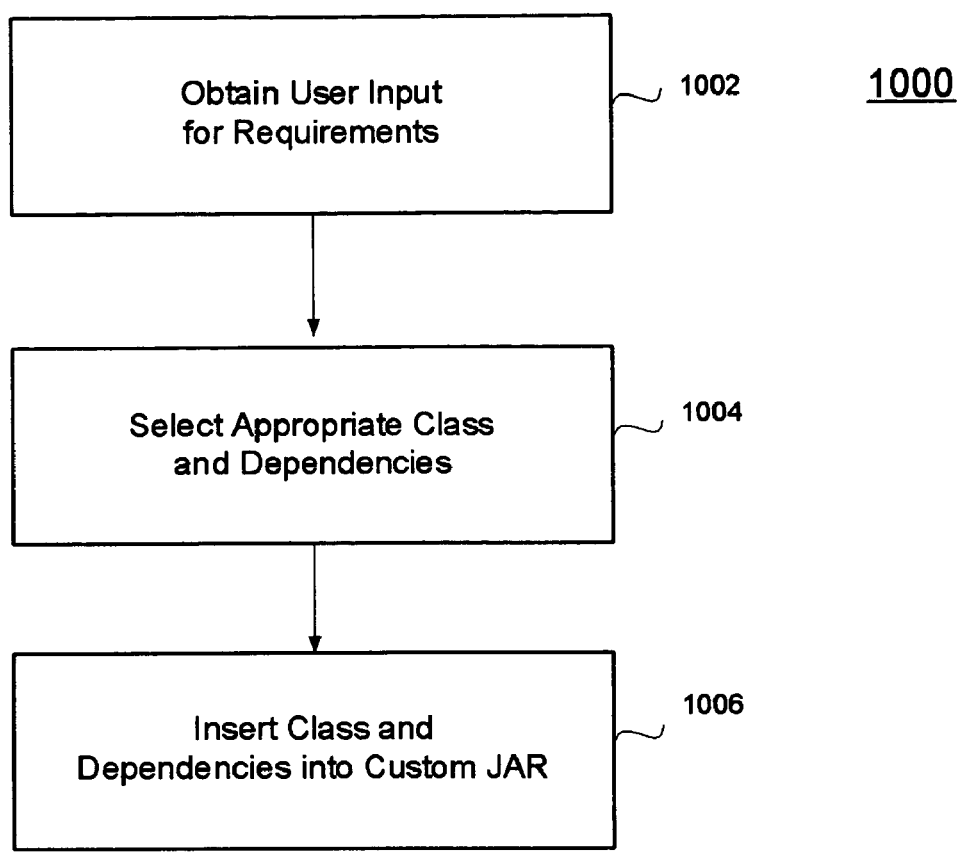
FIG. 10 shows a process for compiling a custom Java program optimized for its application, in accordance with the preferred embodiment of the present invention.
Figure 11:
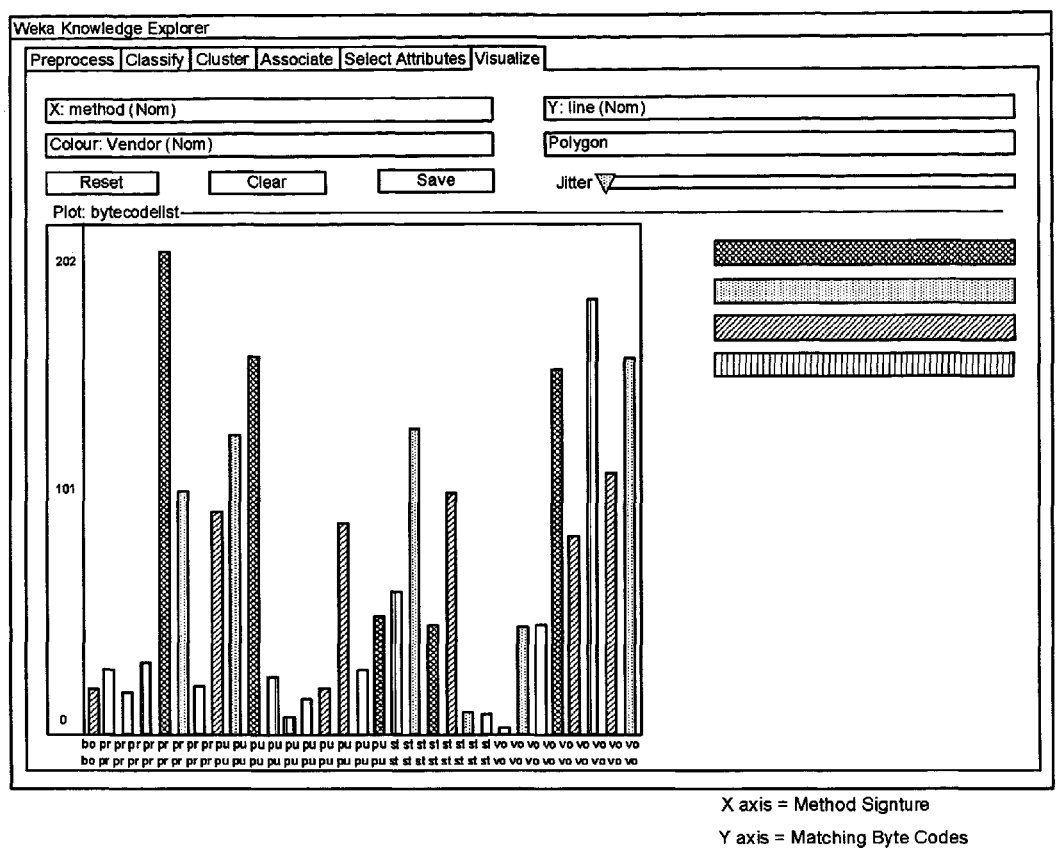
FIG. 11 shows an example GUI output by BCI 200 showing the number of lines of code for selected method signatures for each vendor implementation, in accordance with the preferred embodiment of the present invention.

With reference now to FIG. 10, there is shown a process for compiling a custom Java program optimized for its application, in accordance with the preferred embodiment of the present invention. Process 1000 begins at step 1002, with the user inputting particular requirements for a Java application into BCI 200. For example, the user would indicate size, performance, or some other desired design metric by listing the required parameters (e.g., lines of code, "try-catch" block, etc.). As depicted at step 1004, based on these user requirements, BCI 200 selects the appropriate classes and dependencies within the database 202 that best match the user requirements (input at step 1002). For example, if the user was optimizing based on code size, BCI 200 looks up the size of the smallest implementation of each class called by the custom program's code within the vendor database 202 stored at step 810, and adds them as a running total for the program. At the end of this example analysis, a design target for the sum total of lines of code for the program is determined by adding up to the total number of lines of code for each of the smallest vendor-implementations of each class called by the program. If the vendor-implemented classes are incorporated or utilized in the program, this sum total gives an indication of how large the final compiled version of those classes will be in the custom application. For example, in the case of a JVM, the total size of all classes would indicate how large the rt.jar should be. Similar metrics could be used for performance, such as how many native calls are made, etc. FIG. 11 shows an example GUI output by BCI 200 showing the number of lines of code for selected method signatures for each vendor implementation.

At step 1006, the program designer inserts the best classes and dependencies (including all preferred libraries, etc.) into the customized program (such as a JAR) based on the selection at step 1004. Analysis is also performed to determine if those best interfaces result in conflicting classes with other vendor classes. If a conflict is determined, the interfaces without a conflict are chosen. The result of the analysis outputs a JAR file optimized to perform that application's operation. For example, the preferred embodiment enables a specialized rt.jar file and associated programs to be created. Alternatively, the program designer may decide to utilize an existing Java implementation of the class(es) for use with the custom program.

As will now be appreciated, the preferred embodiment of the present invention allows for some aspect of a program's execution such as a smaller footprint (physical install), fewest lines of code, or fewest number of native calls to be optimized during the design process. When the user selects to create a specialized JAR using the tools of the preferred embodiment, the best interfaces available from an accessible database are chosen for integration in a custom program based on the user's requirements.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention. While this invention is described in terms of the best mode for achieving this invention's objectives, it will be appreciated by those skilled in the art that variations may be accomplished in view of these teachings without deviating from the spirit or scope of the present invention.

What is claimed is:

1. A method for optimizing a software program, the method comprising:
   a computer executing a software tool that causes the computer to perform:
      prior to compilation and execution of an optimized software program:
         decompiling a plurality of vendor files, the decompiling including extracting class data from a machine-executable first object originating from a first software vendor and extracting class data from a machine-executable second object originating from a second software vendor;
         storing the extracted class data extracted from the first and second objects in a code database in association with an identification of the first and second vendors, respectively;
         analyzing a plurality of similar first programs to determine an attribute set of a standard implementation; and
         in the code database, labeling the second program as a standard implementation or a non-standard implementation based upon how closely the attributes of the second program match the determined attribute set of the standard implementation;
         detecting from the extracted class data in the code database a common method of a common class of the first object and the second object; and
         in response to detecting the common method, analyzing the common method to determine, for each of the first and second vendors, statistical values for a plurality of design metrics of the common method and storing the statistical values for the plurality of design metrics in the code database;
      thereafter, compiling the optimized software program, the compiling including selecting, based upon the statistical values in the code database, one of the first object and the second object most closely matching a design specification for incorporation into the optimized software program.

2. The method according to claim 1, wherein the class data includes method signatures, byte codes and byte arguments.

3. The method according to claim 1, wherein the design specification is based at least in part on user input.

4. The method according to claim 1, wherein at least one of the first object and the second object comprises a Java Virtual Machine.

5. The method according to claim 1, wherein a first virtual machine from the first software vendor includes at least the first object.

6. A data processing system for optimizing a software program, said data processing comprising:
  processor hardware; and
  data storage coupled to the processor hardware, the data storage including a code database and a software tool that, when executed by the processor hardware, causes the data processing system processor hardware to perform:
    prior to compilation and execution of an optimized software program:
      decompiling a plurality of vendor files, the decompiling including extracting class data from a machine-executable first object originating from a first software vendor and extracting class data from a machine-executable second object originating from a second software vendor;
      storing the extracted class data extracted from the first and second objects in a code database in association with an identification of the first and second vendors, respectively;
      analyzing a plurality of similar first programs to determine an attribute set of a standard implementation; and
      in the code database, labeling the second program as a standard implementation or a non-standard implementation based upon how closely the attributes of the second program match the determined attribute set of the standard implementation;
      detecting from the extracted class data in the code database a common method of a common class of the first object and the second object; and
      in response to detecting the common method, analyzing the common method to determine, for each of the first and second vendors, statistical values for a plurality of design metrics of the common method and storing the statistical values for the plurality of design metrics in the code database;
    thereafter, compiling the optimized software program, the compiling including selecting, based upon the statistical values in the code database, one of the first object and the second object most closely matching a design specification for incorporation into the optimized software program.

7. The system according to claim 6, wherein the class data includes method signatures, byte codes and byte arguments.

8. The system according to claim 6, wherein the design specification is based at least in part on user input.

9. The system according to claim 6, wherein at least one of the first object and the second object comprises a Java Virtual Machine.

10. The system according to claim 6, wherein a first virtual machine from the first software vendor includes at least the first object.

11. An article of manufacture comprising a machine-readable storage medium including program code embedded therein for optimizing a software program, wherein the program code causes a data processing system to perform:
  prior to compilation and execution of an optimized software program:
    decompiling a plurality of vendor files, the decompiling including extracting class data from a machine-executable first object originating from a first software vendor and extracting class data from a machine-executable second object originating from a second software vendor;
    storing the extracted class data extracted from the first and second objects in a code database in association with an identification of the first and second vendors, respectively;
    analyzing a plurality of similar first programs to determine an attribute set of a standard implementation; and
    in the code database, labeling the second program as a standard implementation or a non-standard implementation based upon how closely the attributes of the second program match the determined attribute set of the standard implementation;
    detecting from the extracted class data in the code database a common method of a common class of the first object and the second object; and
    in response to detecting the common method, analyzing the common method to determine, for each of the first and second vendors, statistical values for a plurality of design metrics of the common method and storing the statistical values for the plurality of design metrics in the code database;
  thereafter, compiling the optimized software program, the compiling including selecting, based upon the statistical values in the code database, one of the first object and the second object most closely matching a design specification for incorporation into the optimized software program.

12. The article of manufacture according to claim 11, wherein the class data includes method signatures, byte codes and byte arguments.

13. The article of manufacture according to claim 11, wherein the design specification is based at least in part on user input.

14. The article of manufacture according to claim 11, wherein at least one of the first object and the second object comprises a Java Virtual Machine.

15. The article of manufacture according to claim 11, wherein a first virtual machine from the first software vendor includes at least the first object.

* * * * *